(12) United States Patent
Yochai (10) Patent No.: US 7,574,538 B1
(45) Date of Patent: Aug. 11, 2009

(54) CONTIGUOUS I/O COMMAND QUEUING WITHIN A DATA STORAGE DEVICE

(75) Inventor: Yechiel Yochai, Lincoln, RI (US)

(73) Assignee: EMC Corporation, Hopkinton, MA (US)

( * ) Notice: Subject to any disclaimer, the term of this patent is extended or adjusted under 35 U.S.C. 154(b) by 526 days.

(21) Appl. No.: 10/879,543

(22) Filed: Jun. 29, 2004

(51) Int. Cl.
*G06F 3/00* (2006.01)

(52) U.S. Cl. .................... 710/52; 710/5; 710/6; 710/36

(58) Field of Classification Search ............. 710/52–57
See application file for complete search history.

(56) References Cited

U.S. PATENT DOCUMENTS

| | | | |
|---|---|---|---|
| 4,425,615 A | 1/1984 | Swenson et al. | |
| 5,548,795 A | 8/1996 | Au | |
| 5,613,155 A * | 3/1997 | Baldiga et al. .................. | 710/5 |
| 5,644,786 A * | 7/1997 | Gallagher et al. ............. | 710/30 |
| 5,729,718 A | 3/1998 | Au | |
| 6,311,256 B2 | 10/2001 | Halligan et al. | |
| 6,557,055 B1 * | 4/2003 | Wiese .......................... | 710/36 |
| 6,721,870 B1 | 4/2004 | Yochai et al. | |
| 6,845,405 B1 * | 1/2005 | Thelin .......................... | 710/6 |
| 6,877,045 B2 * | 4/2005 | Goode et al. .................... | 710/6 |
| 7,254,654 B1 * | 8/2007 | Davis et al. .................... | 710/52 |
| 2003/0028626 A1 * | 2/2003 | Hennessey et al. .......... | 709/220 |

* cited by examiner

*Primary Examiner*—Alan Chen
(74) *Attorney, Agent, or Firm*—Daly, Crowley, Mofford & Durkee, LLP (57) ABSTRACT

In a data storage system having a drive I/O command queue associated with a data storage device, contiguous I/O requests of at least a predetermined size may be processed in a pipeline mode of operation by issuing to the command queue a plurality of contiguous I/O request portions, each comprising a portion of the I/O request, so that a next one of the I/O request portions is in the command queue before the data storage system completes a current I/O request portion. The data storage device may implement I/O reordering based on data location and contain at least two device I/O command queues or, alternatively, may not implement such reordering and contain a single command queue. In one embodiment, a performance parameter of the data storage system, such as the bandwidth requirement for the contiguous I/O request, is monitored and the size of subsequent I/O request portions and/or the state of the pipeline mode of operation are adjusted accordingly. With this arrangement, large contiguous I/O requests can be executed at a higher bandwidth, without adversely impacting other I/O requests for the same device.

19 Claims, 6 Drawing Sheets

CONTIGUOUS I/O COMMAND QUEUING WITHIN A DATA STORAGE DEVICE

CROSS-REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to data storage devices in which sequential I/O accesses are faster than random I/O accesses and, more particularly, to a pipeline method of issuing I/O requests to a command queue of a data storage device.

BACKGROUND OF THE INVENTION

Disk drives are used in many different types of computer systems to store data and include a recording medium (e.g., a magnetic recording medium or an optical recording medium) on which information can be written for storage purposes and from which stored information can be read. The recording medium is typically in the form of one or more disks that rotate about a spindle, each disk including a plurality of tracks in the form of concentric areas on which information is recorded. In a disk drive that includes multiple disks, the disks are conventionally stacked on the spindle so that corresponding tracks overlie one another. Each of the tracks is conventionally subdivided into a plurality of sectors, or segments that define the smallest amount of data that is written to or read from the disk in one operation.

Data is read from and written to the disk using a head that is positioned adjacent to the surface of the disk via an arm. In operation, the disk is rotated at a high rate of speed (e.g., 5,400 rpm, 7,200 rpm or 10,033 rpm) and the arm is pivoted by an actuator to move the head to a position above a desired track. The combination of the rotation of the disk and the movement of the head by the actuator enables the head to be positioned adjacent to any sector of the disk to access (i.e., read information from or write information to) that sector.

Disk drives may be coupled directly to a host processor to provide data storage services to the host processor. In this type of arrangement, the host processor performs basic I/O operations in connection with data requests, such as data read and write operations and the disk drive includes a controller that maintains a command queue, or list containing I/O requests, or commands issued by the host processor and waiting to be executed by the disk drive.

Disk drives also may be part of a larger data storage system comprising a plurality of disk drives and a controller, such as the Symmetrix™ system manufactured by EMC Corporation of Hopkinton, Mass. These systems may be coupled to one or more host processors and provide storage services to each host processor. In this type of arrangement, typically the host processors perform basic system I/O operations in connection with data requests, such as data read and write operations, and the controller contains one or more processors, sometimes referred to as disk directors and host directors, that control execution of I/O requests from the hosts and also initiate I/O requests themselves, for example in connection with de-staging or transferring data from the cache to the disks and in connection with administrative functions, such as data backup, mirroring, and rebuild and copy operations. The controller also contains a cache and a global memory for facilitating communication between the host processors and the disk devices. The term "data storage system" is used herein generally to refer to systems including one or more data storage devices, or disk drives providing data storage services to one or more host processors.

Disk drive performance is largely impacted by three characteristics; namely, seek time, latency and data rate. The seek time relates to the delay incurred in positioning the head above the appropriate track. In the worst case, the seek time is defined by the delay incurred in moving the head between the inner and outer tracks. The latency of the system is the time it takes for the rotation of the disk to bring the desired sector to a position underlying the head. The worst case latency is defined by the time it takes to complete a full rotation of the disk. Finally, the data rate of the system relates to how quickly data can be read from or written to the disk once the head is positioned above the appropriate sector. The data rate is dependent on the bit density of the information stored on the disk, the rate of rotation of the disk and the disk drive electronics that process the data. The seek time, latency, and data rate of a disk drive determine its data throughput (i.e., how much data can be written to or read from a disk drive within a predetermined amount of time).

In an effort to improve disk drive performance, I/O requests in the command queue are sometimes reordered, meaning that the requests are executed in an order other than the order in which they are placed in the queue. One such technique is described in a U.S. Pat. No. 5,729,718 to Au, entitled "System for Determining Lead Time Latency as Function of Head Switch, Seek, and Rotational Latencies and Utilizing Embedded Disk Drive Controller for Command Queue Reordering."

Another approach to improving data storage system performance is to assign a priority to I/O requests. An example of this approach is described in a U.S. Pat. No. 4,425,615 to Swenson et al., entitled "Hierarchical Memory System having Cache/Disk Subsystem with Command Queues for Plural Disks." Specifically, it is described that a priority value and a sequence number are assigned to each command as it is added to a command queue, so that the highest priority command with the lowest sequence number is executed when the disk device corresponding to the queue becomes idle.

Many times, an application requires a large amount of data to be read or written from a single location on a disk. Such I/O requests are referred to herein as "sequential I/O requests" or "contiguous I/O requests." Because the disk drive head must move from a sector specified in a current, or presently executed I/O request to a sector specified in a next, or subsequently executed I/O request, accessing sequential or contiguous sectors is significantly faster than accessing randomly located sectors.

In response to one or more contiguous I/O requests, "prefetch algorithms" are sometimes used to copy additional data from adjacent sectors into a cache in order to speed up execution of anticipated subsequent I/O requests for the adjacent data. One such prefetch algorithm is described in a U.S. Pat. No. 6,721,870 to Yochai et al. entitled "Prefetch Algorithm for Short Sequences" and assigned to EMC Corporation of Hopkinton, Mass., the assignee of the subject application. Prefetch algorithms can also be used to take advantage of a phenomenon referred to as "locality of reference" which means that often, data required from a drive will be located adjacent to the last data read. However, although data prefetching can significantly improve system performance, if the subsequent I/O operations are directed to a random sequence of data blocks, many of which are not within the portion of data that has been staged into cache memory, then the advantage of prefetching data is considerably reduced. In fact, the performance of the system can be significantly degraded.

SUMMARY OF THE INVENTION

According to the invention, a method executed in connection with a data storage device having a drive I/O command queue, for processing a contiguous I/O request having at least a predetermined size, includes issuing to the command queue a plurality of contiguous I/O request portions, each comprising a portion of the contiguous I/O request, so that a next one of the I/O request portions is in the command queue before the data storage device completes a current one of the I/O request portions. With this arrangement, the drive will process the contiguous I/O request substantially continuously when there is no other load (i.e., I/O requests) on the drive.

When the data storage system has a reordering mechanism that reorders I/O commands in the command queue based on data location, the data storage system must contain at least two drive I/O command queues, such as a low priority command queue and a high priority command queue, in order to implement the invention. In this type of system, the contiguous I/O request portions are sent to the low priority command queue to ensure that the contiguous I/O request will not cause starvation of the other I/O requests that have to be executed. When the data storage device does not implement such I/O reordering, only a single drive I/O command queue is required to implement the invention. By I/O reordering based on data location, it is meant that I/O requests are executed in an order determined by the relative proximity of the data specified in the requests to the data specified in a currently executed I/O request or to the current location of the disk head.

When there is other load on the drive, the other I/O requests will not be adversely impacted by the contiguous I/O request. This is because the number of contiguous I/O request portions from the sequence that would be ahead of the other I/O requests is limited and the time to execute these I/O request portions is very small compared to the time to execute random I/O requests. Further, the I/O request portions of the sequence will be executed more quickly than conventionally possible, since the next I/O request portion will be on the drive command queue before the data storage device completes the current I/O request portion. In this way, the time that other I/O requests have to wait to be executed is minimized. Response time is further improved since missing a disk revolution between executing consecutive I/O request portions is avoided by having the next I/O request portion on the drive queue before the data storage device completes the current I/O request portion.

The invention may include one or more of the following features: contiguous I/O request portions are issued to the drive command queue in a way that ensures that the next portion is in the drive command queue before the previous command has finished. In the case of reordering of I/O requests on the drive queue based on data location, the I/O request portions are sent to the low priority queue in order to prevent starving of other commands in the queue. The size of the I/O request portions may be adjustable, such as in response to at least one of the bandwidth of the data storage device, the load on the data storage device, and the load on a controller running the I/O request.

In one embodiment, the method further includes monitoring the bandwidth of the data storage device in order to adjust the size of the I/O request portions and to determine whether the bandwidth would be increased by issuing the I/O request portions one at a time. The monitoring will track the achieved bandwidth and determine whether the predetermined bandwidth is achieved. In response to the predetermined bandwidth not being achieved, the size of a next I/O request portion is increased; whereas, in response to the predetermined bandwidth being exceeded, the size of a next I/O request portion is decreased.

According to a further aspect of the invention, a data storage system includes a storage medium, at least one I/O command queue, and a processor adapted to issue I/O requests to the command queue. The processor is operable to initiate a pipeline mode operation for processing a contiguous I/O request of at least a predetermined size by issuing to the command queue a plurality of contiguous I/O request portions, each comprising a portion of the I/O request, so that a next one of the I/O request portions is in the command queue before the data storage device completes a current one of the I/O request portions. The storage medium may have a single command queue and no I/O reordering based on data location or may implement I/O reordering based on data location and contain at least two command queues.

Also described is a method, executed in connection with a data storage device having a command queue, for processing a contiguous I/O request having at least a predetermined size including issuing to the command queue a predetermined number of contiguous I/O request portions, each comprising a portion of the I/O request, determining whether the data storage device is achieving a predetermined bandwidth and, in response to the determination, adjusting at least one of: the size of a next I/O request portion to be issued and the state of a pipeline mode of operation in which a next I/O request portion is in the command queue before the data storage device completes a current I/O request portion.

The method may further include reordering of I/O requests based on data location. In this case, the data storage device contains at least two command queues, such as a low priority command queue and the high priority command queue, and the predetermined number of contiguous I/O request portions are issued to the low priority command queue. This arrangement prevents starving I/O requests on the high priority command queue in data storage systems implementing I/O request reordering based on data location.

The size of the next I/O request portion may be increased in response to a determination that the predetermined bandwidth is not achieved and decreased in response to a determination that the predetermined bandwidth is exceeded. Further, the pipeline mode of operation may be terminated in response to a determination that the predetermined bandwidth cannot be achieved with the pipeline mode. And the pipeline mode of operation may be initiated in response to a determination that the predetermined bandwidth can be achieved with the pipeline mode.

BRIEF DESCRIPTION OF THE DRAWINGS

The foregoing features of this invention, as well as the invention itself may be more fully understood from the following description of the drawings in which.

DESCRIPTION OF THE PREFERRED EMBODIMENT

Figure 1:
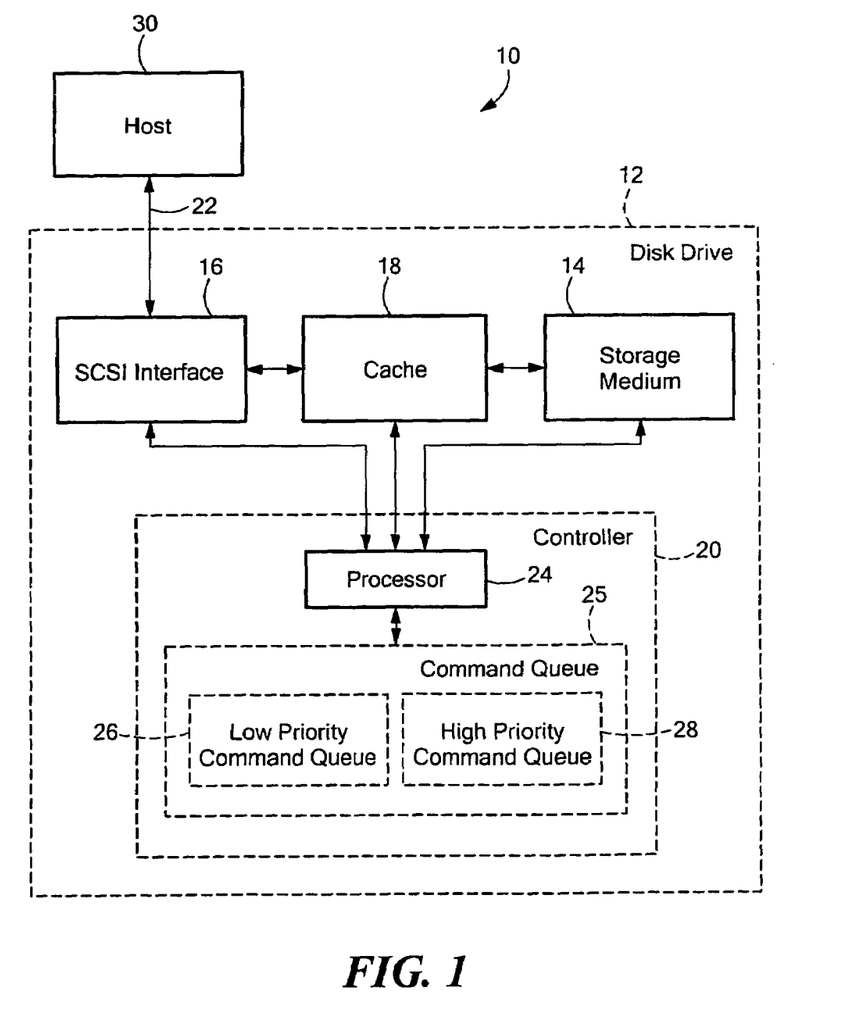
FIG. 1 is a block diagram of a data storage system containing a disk drive coupled directly to a host computer and employing the present invention.

Referring to FIG. 1, a data storage system 10 implementing the present invention includes a data storage device in the form of a disk drive 12 coupled to a host computer 30 via a communication medium 22. The host computer 30 may access the disk drive 12, for example, in performing input/output (I/O) operations or data requests (referred to herein generally as "I/O requests"). More particularly, the host computer 30 may perform different types of data operations, such as data read operations or data write operations, in accordance with different applications running on the host computer. For example, an application executing on the host computer 30 may perform administrative functions, such as backup or mirroring or other types of functions.

The communication medium 22 may be any one of a variety of network connections, bus, and/or other type of data link, such as hardwire or other connections known to those skilled in the art. For example, the communication medium 22 may be the Internet, an intranet, network or other connection by which the host computer 30 may access and communicate with the data storage system 12. The communication medium 22 may use a variety of different communication protocols such as SCSI, ESCON, Fibre Channel, or GIGE (Gigabit Ethernet), and the like.

Figure 3:
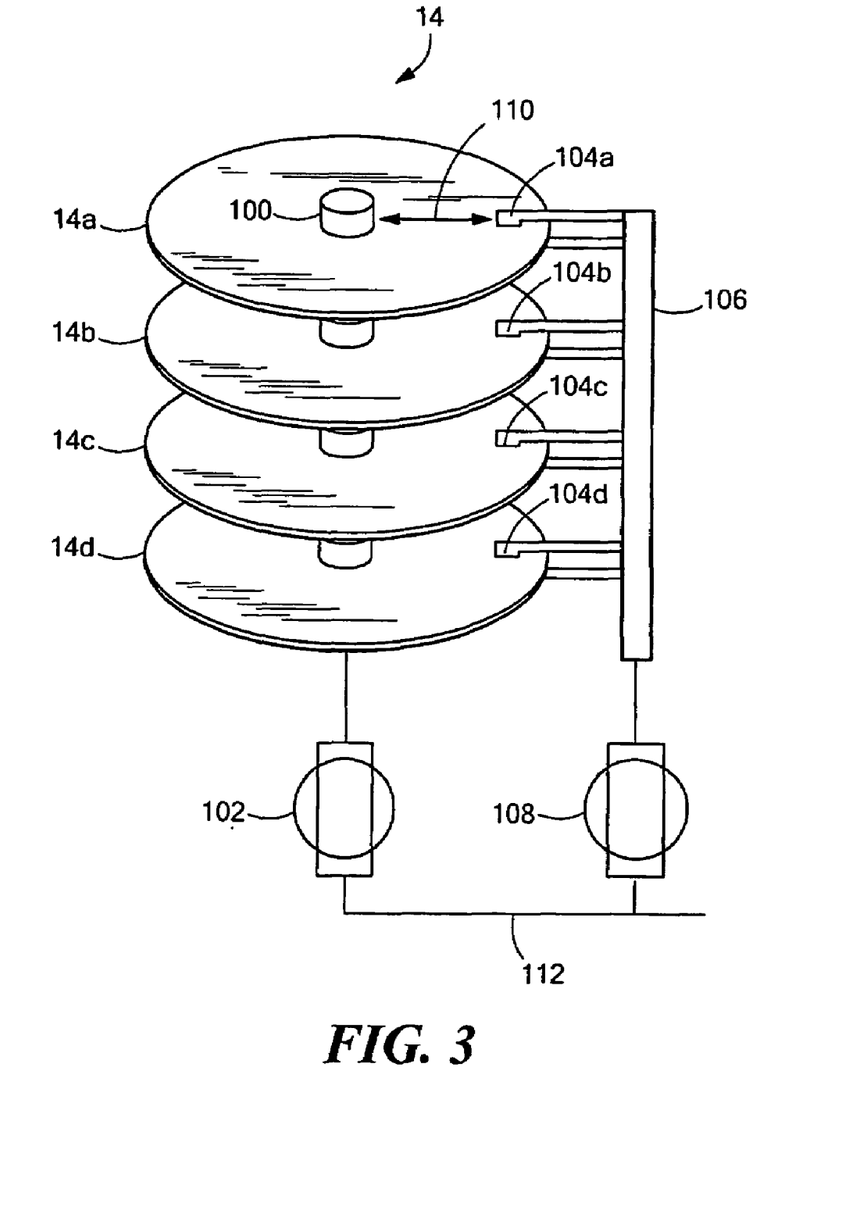
FIG. 3 shows an illustrative storage medium of the disk drives of FIGS. 1 and 2.

The disk drive 12 includes a storage medium 14 having one or more disks, such as is shown and described in conjunction with FIG. 3. The disk drive may optionally be provided with a cache 18 that is coupled to the storage medium in a conventional fashion. The cache 18 provides temporary storage of data in transit between the host 30 and the storage medium 14. An interface unit 16 (e.g., a SCSI interface unit) couples the disk drive to the host computer 30 and communicates with the host computer 30 via bus 22, thereby receiving I/O requests and storing or providing data and status information in response to the requests.

The disk drive 12 also includes a controller 20 that is coupled to each of the other components and controls the operation of the disk drive. More particularly, the controller 20 includes a processor 24 for controlling storage of I/O requests from the host computer 30 by maintaining a command queue 25 and determining the order in which the I/O requests are executed. One illustrative method for determining which I/O request to process next and for implementing I/O reordering based on data location is shown and described below in conjunction with FIG. 5. The processors included in the host computer 30 and the disk drive 12 and those of FIG. 2 may be any one of a variety of commercially available single or multi-processor arrangements, such as an Intel-based processor, IBM mainframe or other type of commercially available processor.

The command queue 25 may contain a single list or queue of I/O requests or, alternatively, may contain more than one list or queue. In one embodiment, the command queue 25 contains a low priority command queue 26 and a high priority command queue 28.

According to the invention, and as will be described below, the data storage system 10 is capable of processing a contiguous I/O request of at least a predetermined size according to a pipeline mode of operation, by issuing to the command queue 25 a plurality of contiguous I/O request portions, each comprising a portion of the I/O request, so that a next one of the I/O request portions is in the command queue 25 before the data storage device 12 completes a current one of the I/O request portions.

As will be described below, the disk drive 12 can contain a single command queue 25 if the controller 20 does not implement I/O reordering based on data location. If the controller 20 implements I/O reordering based on data location, then the command queue 25 contains at least two command queues, such as the illustrated low priority command queue 26 and the high priority command queue 28. It will be appreciated that although the controller 20 can contain only a single command queue in embodiments not implementing I/O reordering based on data location, it is possible for such embodiments to contain more than one command queue. Similarly, although the controller 20 must contain at least two command queues in embodiments implementing I/O reordering based on data location, it is possible for such embodiments to contain more than two command queues.

In embodiments implementing I/O reordering based on data location, in which the command queue 25 contains queues 26 and 28, each queue 26, 28 has a user-defined time out value associated therewith that is used by the processor 24 in determining which I/O request to execute next, as will be described in connection with the illustrative process of FIG. 5. Accordingly, each entry in the command queues 26, 28 contains a time stamp value for comparison to the time out value. Additionally, entries in the command queue 25 contain information pertinent to the execution of that request including, but not limited to: an identification of the host or other issuer of the I/O request, an indication of the relative sequence in which the request was received, the number of segments to be transferred for the request, and the starting segment address of the transfer.

Figure 2:
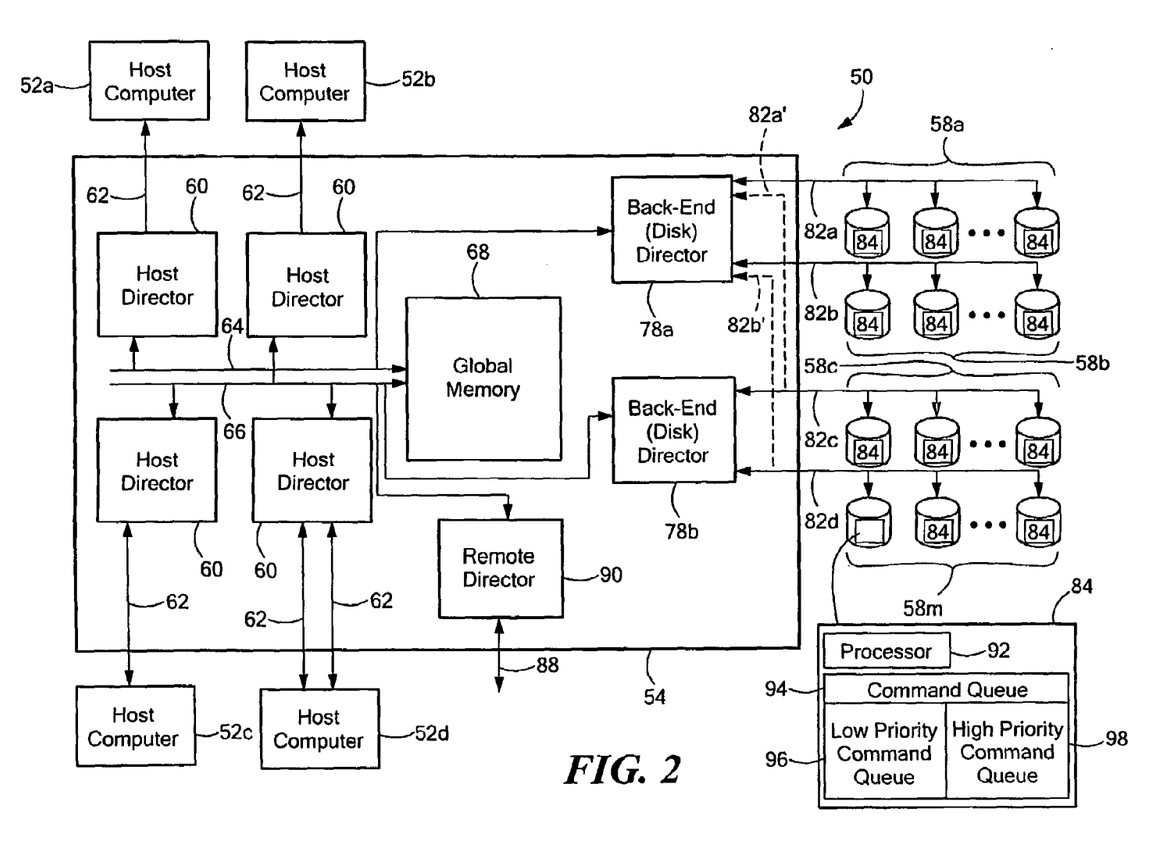
FIG. 2 is a block diagram of a data storage system containing multiple disk drives and a controller adapted to couple the disk drives to multiple host computers and employing the present invention.

Referring also to FIG. 2, an alternative data storage system 50 implementing the present invention includes host computers 52a, 52b, 52c, 52d (referred to herein generally as host computers 52) connected to data storage devices in the form of disk devices or volumes, such as the illustrated arrangement consisting of d rows of disks or volumes 58a, 58b, 58c, 58d (referred to herein generally as disk devices 58) through a controller 54. One illustrative controller 54 is the Symmetrix™ system manufactured by EMC Corporation of Hopkinton, Mass. Communications from the host computers 52 connect to a port of one or more host directors 60 over SCSI bus lines 62. Each host director, in turn, connects over one or more system buses 64 or 66 to a global memory 68. The global memory 68 is preferably a large memory through which the host directors 60 can communicate with the disk devices 58 and includes a cache that provides temporary storage of data in transit between the host computers 52 and the disk devices 58. The memory 68 may also include a common area for supporting communications between the host computers 52 and the disk devices 58 and tables, such as a replacement queue for mapping areas of the disk devices 58 to areas in the cache.

The data storage system 50 may be remotely coupled to another data storage system (not shown) via a data link 88. The remote system may be used to mirror data residing on the data storage system 50. To support such a configuration, the data storage system 50 can include a remote director 90 to connect to the data line 88 and handle transfers of data over that link. The remote director 90 communicates with the global memory 68 over one of the system buses 64, 66.

Also connected to the global memory 68 are back-end (or disk) directors 78a, 78b, each of which contains a processor for controlling the transfer of data between one or more disk devices 58 and the cache and between the disk devices and the host computers 52. The disk directors are installed in the controller 54 in pairs. For simplification, only two disk directors, indicated as disk directors 78a, 78b, are shown. However, it will be understood that additional disk directors may be provided.

Each of the disk devices 58 contains a controller 84. As shown in the enlarged view of the controller 84 of a disk device 58m, the controller contains a processor 92 for controlling storage of I/O requests from the host computers 52 by maintaining a command queue 94 and determining the order in which the I/O requests are executed, as may be achieved with the illustrative process of FIG. 5. Like the command queue 25 of FIG. 1, the command queue 94 may contain one or more queues for each of the disk devices 58, depending on whether I/O reordering based on data location is implemented. For example, when such I/O reordering is not implemented, the command queue 94 may contain a single list of I/O requests; whereas, when such I/O reordering is implemented, the command queue 94 contains at least two command queues, such as a low priority command queue 96 and a high priority command queue 98.

Each of the disk directors 78a, 78b supports four bus ports. The disk director 78a connects to two primary buses 82a and 82b, as well as two secondary buses 82a' and 82b'. The buses are implemented as 16-bit wide SCSI buses. However, as indicated earlier, other bus protocols besides the SCSI protocol may be used. The two secondary buses 82a' and 82b' are added for redundancy. Connected to the primary buses 82a, 82b, are a plurality of disk devices (e.g., disk drive units) 58a and 58b, respectively. The disk director 78b connects to a plurality of disk devices or disk drive units 58c and 58d via primary buses 82c, 82d, respectively. Also connected to the primary buses 82c and 82d are the secondary buses 82a' and 82b'. When a primary bus is active, its corresponding secondary bus in inactive, and vice versa. The secondary buses of the disk director 78b have been omitted from the figure for purposes of clarity.

Like the host directors 60, the disk directors 78a, 78b are also connected to the global memory 68 via one of the system buses 64, 66. During a write operation, the disk directors read data stored in the global memory 68 by a host director 60 and write that data to the logical volumes for which they are responsible. During a read operation and in response to a read command, the disk directors read data from a logical volume and write that data to global memory for later delivery by the host director 60 to the requesting host computer 52.

More particularly, the host directors 60 typically perform storage (or write) and retrieval (or read) operations in connection with information that has been stored in the cache memory, and the disk directors 78a, 78b perform operations to transfer information in the storage devices 58 to the cache memory for buffering (i.e., staging) and to transfer information from the cache memory to the storage devices 58 for storage (de-staging). After a disk director 78a, 78b has stored the data in the cache memory, it notifies the host director 60 that the requested data is available. At some point after receiving the notification, the host director 60 uses the tables to identify the appropriate cache slot and retrieves the requested data from that cache slot. As is discussed below, conventionally, even in processing large contiguous I/O requests, the host waits to receive this notification of completion of a prior I/O request before issuing a next sequential I/O request. This scheme has several disadvantages that are solved by aspects of the present invention, such as the pipeline mode of operation.

The two illustrative data storage systems 10, 50 described in conjunction with FIGS. 1 and 2, respectively, should not be construed as a limitation on the invention. The pipeline mode of operation can be implemented in any data storage system configuration containing a storage medium, a processor that issues I/O requests to the storage medium (i.e., an I/O issuer, such as a host or data storage system controller such as a disk director), and one or more command queues, depending on whether I/O reordering based on data location is implemented and which is able to perform sequential I/O accesses faster than random accesses.

Referring to FIG. 3, an illustrative disk storage medium 14 (FIG. 1) includes a plurality of disks 14a-14n rigidly attached to a spindle 100. A motor 102 rotates the spindle, thereby rotating the disks at a predetermined speed during each data reading and writing operation. It will be appreciated that the illustrated storage medium 14 may be of a type represented by the disk devices 58 of FIG. 2. A plurality of data transducer heads 104a-104d are connected in a stack assembly 106. An actuator 108 is adapted to move the stack assembly 106 along an axis 110 in a motion referred to as a "seek".

A control circuit (not shown) controls the rotational speed of the disks 14a-14n and the position of the stack assembly 106 by providing appropriate control signals to the motor 102 and to the actuator 108 via a bus 112. The control circuit may be part of the storage medium 14 or may be part of the controller (e.g., controller 20 of FIG. 1 or controller 84 of FIG. 2).

Figure 4:
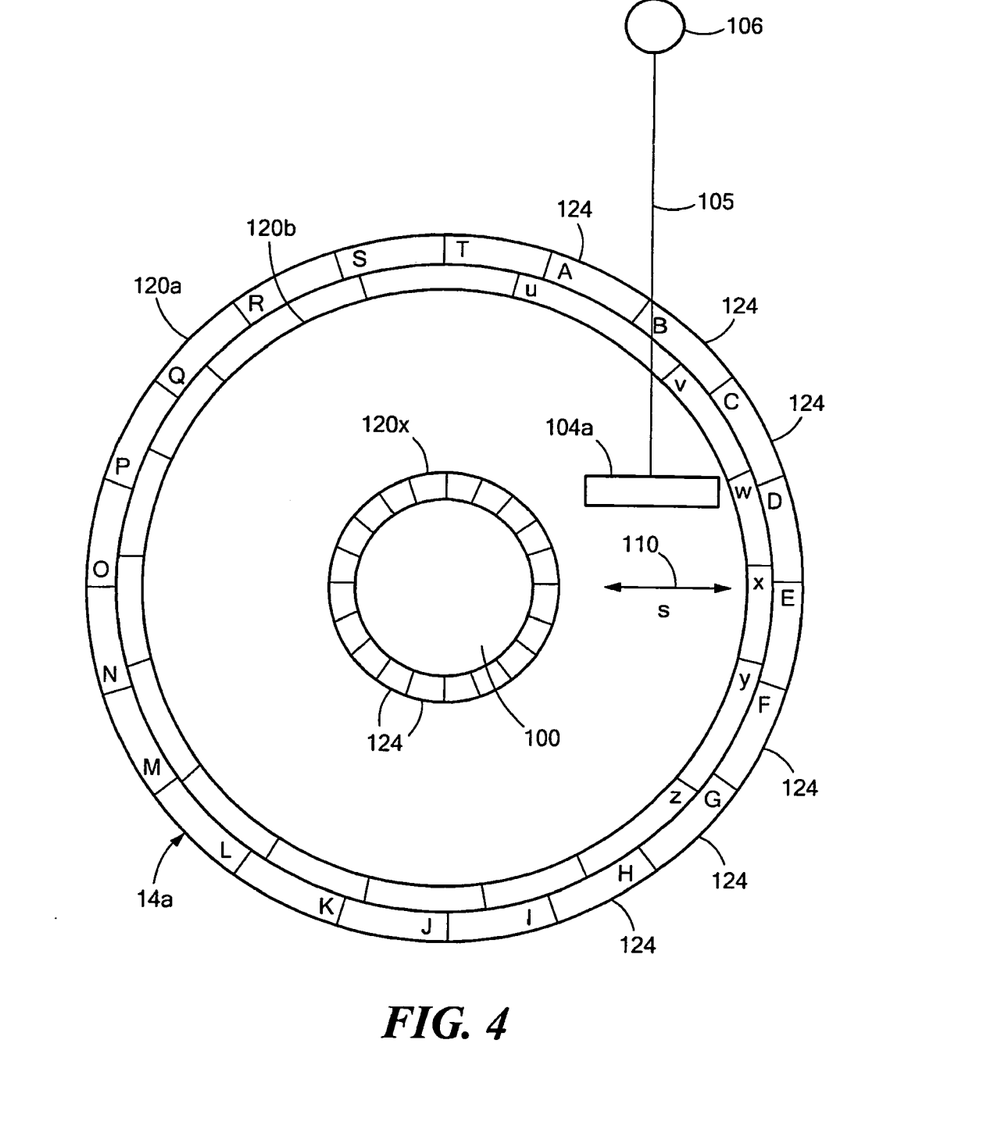
FIG. 4 shows an illustrative disk of FIG. 3.

Referring also to FIG. 4, a simplified representation of an illustrative disk 14a (FIG. 3) includes a plurality of tracks 120a-120x, each formed as a concentric ring. Only two outer tracks 120a and 120b and the innermost track 120x are shown for simplicity of illustration. Each track is divided into a plurality of blocks, segments, or sectors 124. For ease of discussion, several of the sectors are labeled A, B, . . . Z, as shown. The concept of a "logical block address" is generally used to refer to a particular location on the disk in terms of the track and sector of the disk.

Conventionally, when a host computer, such as the host 30 of FIG. 1 or a host 52 of FIG. 2, or other I/O issuer, such as a disk director 78a of FIG. 2, has a requirement for a large contiguous, or sequential I/O request (e.g., a read request to read data from a plurality of adjacent, or contiguous sectors of a disk and write the data to cache or a write command to read data from the cache and write the data to a plurality of contiguous sectors of the disk), the I/O issuer breaks the I/O request into smaller chunks or portions (referred to herein as "I/O request portions" or simply "I/O portions") and issues the I/O request portions to the appropriate command queue associated with the data storage device one at a time. For example, in the case of a read request, the data storage device completes a current I/O portion and notifies the I/O issuer that the requested data is available in cache before the I/O issuer sends a subsequent I/O portion to the data storage device. Generally, the I/O request portions are sized in order to meet a bandwidth requirement for the contiguous I/O request. A bandwidth requirement is a requirement for a minimum speed of data flowing into or out of the cache. In the case of a read request, the bandwidth requirement is a requirement that a certain amount of data be read from a disk and written to cache within a certain amount of time and in the case of a write command, the bandwidth requirement is a requirement that a certain amount of data be read from cache and written to the disk within a certain amount of time.

However, this approach can suffer certain drawbacks based on the size of the issued I/O request portions. Specifically, if the I/O portions are too small and the disk has additional workload, then the required bandwidth may not be achieved. Whereas, if the I/O portions are too large, then the response time of other I/O requests on the same data storage device spindle may suffer. This is because each I/O request portion will take longer to process and therefore, will require other I/O requests to wait a longer time to be executed. Stated differently, the smaller the size of the I/O request portions, the quicker the I/O request portions are completed and the shorter the length of time that other I/O requests for the same system resources will be required to wait.

Furthermore, by issuing these I/O request portions one at a time, a full rotation of the disk may be wasted before processing the next contiguous I/O portion. For example, consider the case where a first I/O request portion requires data to be read from the entire outer track 120a of the disk (i.e., sectors A-T in FIG. 4). While the next I/O request portion may require data to be read on the next inner track 120b, starting at sector U, the processor 24 may not be able to issue this next I/O request portion for data at sector U quickly enough following completion of the current I/O request portion for data at sector T in order to avoid wasting an entire revolution of the disk rotation.

Figure 5:
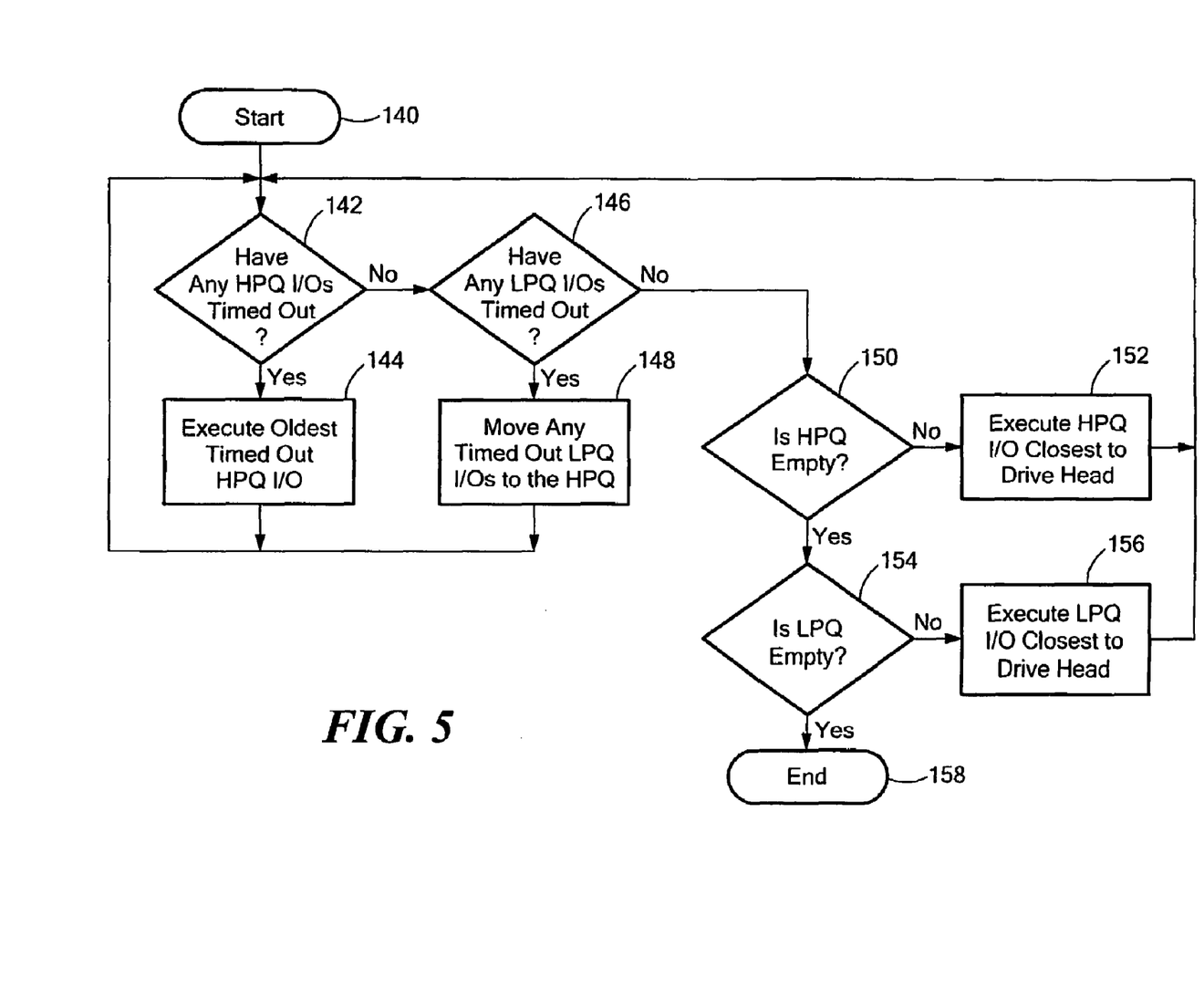
FIG. 5 is a flow diagram illustrating a process optionally implemented in the data storage systems of FIGS. 1 and 2 for selecting a next I/O request or request portion for execution while implementing I/O reordering based on data location.

Referring to FIG. 5, an illustrative process is shown for determining a next I/O request or I/O request portion for execution and for implementing I/O reordering based on data location. The process of FIG. 5 is described in connection with a data storage system containing at least two command queues for each disk drive, such as the low priority command queue 26 and a high priority command queue 28 (FIG. 1), since at least two queues are required to implement the invention in systems having such I/O reordering. For simplicity of discussion, the term I/O request will be used in connection with the description of FIG. 5. However, it will be appreciated that an I/O request may represent an entire I/O request as issued by an I/O issuer, or may represent a smaller chunk, or portion of an I/O request. The process of FIG. 5 will be described as being performed by the illustrative processor 24 in connection with queues 26, 28 of FIG. 1. However, it will be appreciated that the same process can be implemented by the processors 92 of FIG. 2 in connection with queues 96, 98.

The flow diagrams shown herein (FIGS. 5 and 6) illustrate techniques which would be implemented in an electronic device or in a computer processor, such as the processor 24 (FIG. 1). Rectangular elements, herein denoted "processing blocks," can represent computer software instructions or groups of instructions. Diamond shaped elements, herein denoted "decision blocks," can represent computer software instructions, or groups of instructions that affect the execution of the computer software instructions represented by the processing blocks. Alternatively, the processing and decision blocks represent functions performed by functionally equivalent circuits, such as a digital signal processor circuit or application specific integrated circuit (ASIC), or discrete electrical components. The flow diagrams do not depict the syntax of any particular programming language. Rather, the flow diagrams illustrate the functional information one of ordinary skill in the art requires to fabricate circuits or to generate computer software to perform the processing required of the particular apparatus. It will be appreciated by those of ordinary skill in the art that, unless otherwise indicated herein, the particular sequence of blocks described is illustrative only and can be varied without departing from the spirit of the invention. Thus, unless otherwise stated, the blocks described below are unordered meaning that, when possible, the blocks can be performed in any convenient or desirable order.

The process of FIG. 5 commences at block 140, following which it is determined, in block 142, whether any I/O requests on the high priority command queue 28 have timed out. If one or more of the entries on the high priority command queue have timed out, then in block 144, the oldest of the timed out entries is executed, following which the process is repeated starting at block 142. If however, there are no entries on the high priority command queue that have timed out, then in block 146, it is determined whether any entries on the low priority command queue 26 have timed out. In response to one or more entries on the low priority command queue having timed out, such entries are moved to the high priority command queue in block 148. The way in which it is determined whether a particular I/O request has timed out is by calculating the time that the I/O request has been in the queue (such as by subtracting the initial time stamp value from a present time) and comparing the calculated time to the user-defined time out value associated with the queue.

If there are no entries on either the low priority command queue 26 or the high priority command queue 28 that have timed out, then it is determined in decision block 150 whether the high priority command queue is empty. If the high priority command queue is not empty, then according to block 152, the I/O request on the high priority command queue that specifies a data location closest to the present location of the respective head 104a-104d (FIG. 3) is executed, following which the process is repeated starting at block 142. If the high priority command queue is empty, then it is determined in decision block 154 whether or not the low priority command queue is empty. If the low priority command queue is not empty, then according to block 156, the I/O request on the low priority command queue that specifies a data location closest to the present location of the respective head 104a-104d is executed, following which the process is repeated starting at block 142.

According to the invention, the host 30 (FIG. 1) or other I/O issuer such as a host or disk director of FIG. 2 is capable of implementing a pipeline mode of operation in which large contiguous I/O requests are still broken into smaller portions, but the I/O issuer issues a next I/O portion to the data storage device before a current I/O portion is completed so that the next I/O portion is in the command queue 25 before the device completes the current I/O portion (i.e., more than one I/O portion is issued at a time). With this arrangement, the large contiguous I/O request can be completed at a higher bandwidth, without adversely impacting other I/O requests. This is in contrast to the conventional arrangement where the I/O issuer waits to issue a next I/O request portion until a current request portion is completed (i.e., issuing requests one at a time).

In the pipeline mode of operation, by issuing more than one I/O request portion at a time, it is meant that more than one I/O request portion may be issued consecutively. Ensuring that the next I/O request portion is in the command queue 25 before the current I/O request portion is completed is achieved by appropriate selection or adjustment of one or more of the following factors: the size of the I/O request portions and the relative times that the issuer issues the I/O request portions. In one embodiment, I/O request portions are issued so as to maintain a fixed number of I/O request portions on the command queue 25 (i.e., a fixed command queue length) by issuing a new I/O portion each time a current I/O portion is completed.

The pipeline mode of operation may be implemented in a data storage system having only a single command queue 25 (FIG. 1) when I/O reordering based on data location is not implemented. The pipeline mode of operation may also be implemented in a data storage system implementing I/O reordering based on data location, as illustrated by the process of FIG. 5. However, in this type of system, it is necessary that there be at least two command queues for each disk drive, such as queues 26, 28, and that the smaller contiguous I/O request portions issued in the pipeline mode of operation be issued to the low priority queue. This is because otherwise, these smaller contiguous I/O request portions would starve other I/O requests since they will always be selected in block 152 (FIG. 5) as being the closest I/O to the head.

It is important to be able to adjust the size of the I/O portions and to enable and disable the pipeline mode of operation in order to optimize the performance of the data storage system. For example, when there is no load or very light load on the drive, the size of the pipelined I/O portions will have minimal impact on the ability to achieve the required bandwidth. Generally, under such light load conditions, it is desirable to select the size of the I/O portions to be relatively small so as to minimize any adverse impact on other I/O requests that may arrive on the command queue. When there is a medium load level, the smaller the size of the pipelined I/O portions, the lower the achievable bandwidth. And, when there is a heavy load on the data storage device (e.g., over 60 I/Os per second), then it is advantageous to send the I/O portions in larger sizes one at a time (i.e., to disable pipelining) in order to prevent detrimental impact to the other I/O requests on the drive. Furthermore, the load values (i.e., I/Os per second) that qualify as "heavy," "medium," or "light" in the above discussion are dependent on many factors including, but not limited to the size of the I/O portions and the distance between them. An additional difficulty in determining these load values is the fact that the controller may not have enough time to issue the pipelined I/O portions without missing a revolution of the disk. As a result, it is not practical to turn pipelining on and off or to adjust the size of the pipelined I/O portions according to a rigid formula based on the load.

Figure 6:
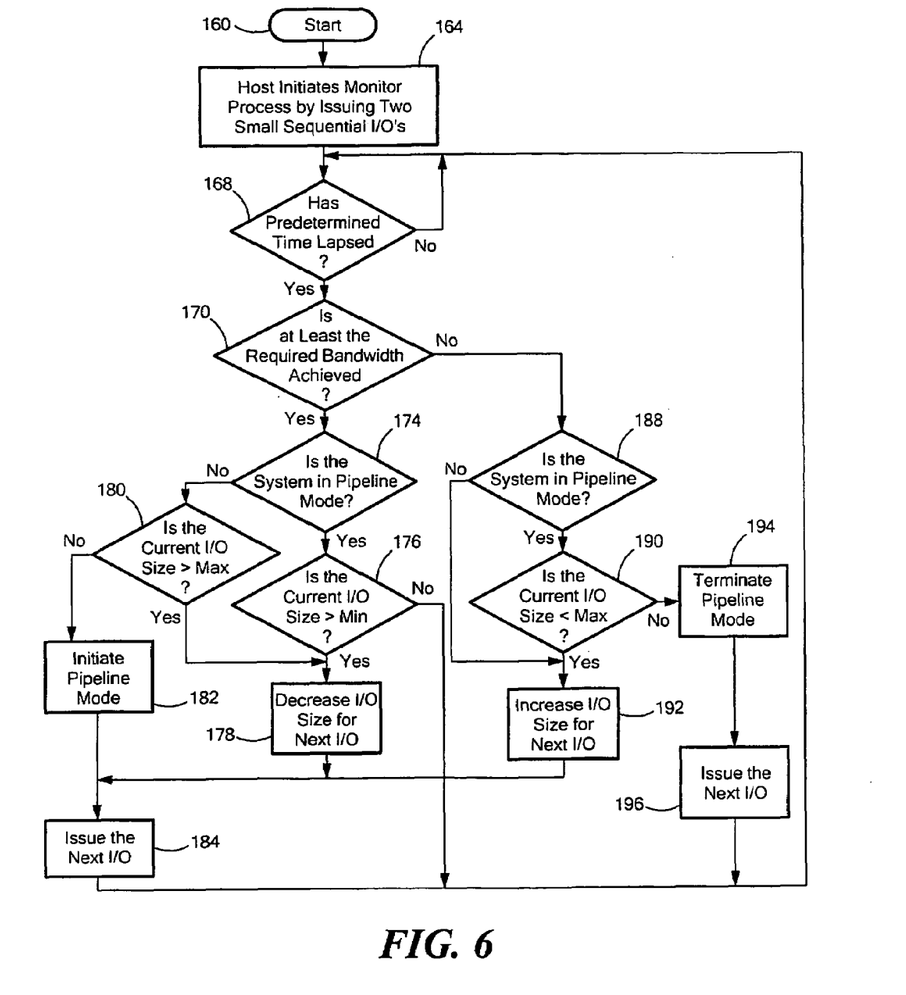
FIG. 6 is a flow diagram illustrating a process for monitoring the bandwidth of the data storage systems of FIGS. 1 and 2 in order to optimize the size of the I/O request portions and implement the pipeline mode of operation according to the invention.

The flow diagram of FIG. 6 illustrates one embodiment of a monitoring process by which an I/O issuer that has a need to issue a large contiguous I/O request monitors a performance parameter and adjusts the size of the I/O portions and determines whether or not pipelining should be enabled accordingly. In the embodiment of FIG. 6, the monitored performance parameter is a specified bandwidth requirement. However, it will be appreciated that other performance parameters may be monitored. Examples of such other parameters are the load on the data storage device and the load on the controller executing or running the I/O request. Additionally, some combination of these or other system performance parameters may be used as a monitoring mechanism for determining the optimum I/O size and whether or not to enable pipelining.

The process of FIG. 6 is applicable to data storage systems of the type implementing I/O reordering based on data location as described in conjunction with FIG. 5 and containing a low priority command queue and a high priority command queue and also to data storage systems of the type not implementing I/O reordering based on data location and containing as few as one command queue. The process of FIG. 6 requires as inputs, the required bandwidth for the large contiguous I/O request, a maximum threshold I/O size for the pipeline mode of operation and a minimum threshold I/O size for the pipeline mode of operation. The range of sizes of the I/O portions in the pipeline mode is generally smaller than the range of sizes of the I/O portions without pipelining. For example, in pipeline mode, the I/O portions may range in size from 32 KB to 256 KB, whereas without pipelining enabled, the typical I/O portion size may be on the order of 1 MB. Thus, in this example, the maximum threshold is 256 KB and the minimum threshold is 32 KB. However, it will be appreciated that the maximum and minimum I/O size thresholds may be readily varied and may be a user-specified parameter.

The process of FIG. 6 commences at block 160 when the I/O issuer determines that there is a need to process a contiguous I/O request of greater than a predetermined size. In the discussion of FIG. 6, the I/O issuer is a host (e.g., host 30 of FIG. 1 or a host 52 of FIG. 2). It will be appreciated however that more generally the process of FIG. 6 may be performed by any I/O issuer including a host director 60 or disk director 78*a*, 78*b* of FIG. 2. In one embodiment, the predetermined size is on the order of at least 20 MB.

In block 164, the host issues two contiguous I/O request portions to the command queue, each I/O request portion being a smaller chunk or portion of the contiguous I/O request and having a predetermined size, such as 32 KB. It will be appreciated that the predetermined size of the two contiguous I/O request portions can be varied. Further, the number of I/O request portions issued in block 164 can be varied, but generally is selected to be a relatively small number, such as between approximately two and four. In the case of a data storage system implementing I/O reordering based on data location and containing a low priority command queue and a high priority command queue, the two I/O request portions are issued to the low priority command queue.

The monitoring process of FIG. 6 is performed periodically. Accordingly, in decision block 168, it is determined whether or not a predetermined amount of time has lapsed. In an illustrative embodiment, the process is executed every 1-2 seconds. If the predetermined time has lapsed, then it is determined in block 170 whether or not the bandwidth requirement for the I/O request is being achieved.

If the bandwidth requirement is not met and pipelining is not enabled as determined in block 188, then the size of the next I/O portion is increased in block 192, following which the next I/O portion is issued in block 182. If the bandwidth requirement is not met and pipelining is enabled, then it is determined in block 190 whether the current size of the I/O portions is less than the maximum threshold. If the current I/O portion size is less than the maximum threshold, then the size of the next I/O portion is increased in block 192, as above. Increasing the size of the subsequent I/O portions will result in increased bandwidth, regardless of whether or not pipeline mode is enabled. The increments by which the I/O size is increased can be readily varied. In one embodiment, the I/O size is doubled from the previous I/O size.

If however the bandwidth requirement is not met and pipelining is enabled, but the current size of the I/O portions is greater than the maximum threshold as determined at block 190, then the required bandwidth cannot be achieved with the pipeline mode of operation. In this case, pipelining is disabled in block 194. Following block 194, the next I/O request portion is issued in block 196, as shown. In the case of a data storage system implementing I/O request reordering based on data location and having a low priority command queue and a high priority command queue, the next I/O request portion is issued to the high priority queue in block 196.

Alternatively, if it is determined at block 170 that the bandwidth requirement is met or exceeded, and pipelining is disabled as determined in block 174, then it is determined in block 180 whether or not the current I/O size is greater than the maximum threshold. If the current I/O size is less than the maximum threshold, then the required bandwidth can be achieved with the pipeline mode of operation. In this case, pipelining is initiated in block 182. If however, the bandwidth requirement is exceeded, pipelining is disabled, but the current I/O size is greater than the maximum threshold, then the size of the next I/O portion is decreased in block 178 following which the next I/O request portion is issued in block 184. The increments by which the I/O size is decreased can be readily varied. In one embodiment, the new I/O size is one-half of the previous I/O size. In the case of a data storage system implementing I/O request reordering based on data location and having a low priority command queue and a high priority command queue, the next I/O request portion is issued to the low priority queue in block 184.

Finally, if the bandwidth requirement is met or exceeded, pipelining is enabled, then it is determined in block 176 whether the current I/O size is greater than the minimum threshold. If the current I/O size is greater than the minimum threshold, then the size of the I/O portion is decreased in block 178. Following blocks 178, 182, and 192, the next I/O request portion is issued in block 184 following which the routine is repeated starting at block 168, as shown. Decreasing the I/O size in this manner, regardless of whether or not pipeline mode is enabled, helps to prevent adversely impacting other I/O requests on the drive.

With the process of FIG. 6, the drive will process the contiguous I/O request portions substantially continuously when there is no other load on the drive. But when there is other load on the drive, these other I/O requests will not be adversely impacted by the contiguous I/O request. This is because the number of contiguous I/O request portions from the sequence that would be ahead of the other I/O requests is limited and the time to execute these I/O request portions is very small compared to the time to execute random I/O requests. Further, the I/O request portions of the sequence will be executed more quickly than conventionally possible, since the next I/O request portion will be on the drive command queue before the data storage device completes the current I/O request portion. In this way, the time that other I/O requests have to wait to be executed is minimized. Response time is further improved since missing a disk revolution between executing consecutive I/O request portions is avoided by having the next I/O request portion on the drive queue before the data storage device completes the current I/O request portion.

The performance improvement achieved using the above-described pipeline process is significant. As an example, consider a 1 MB contiguous I/O request on a 146 GB disk drive operating at 15,000 rpm. Conventionally, by issuing the I/O request as a 1 MB request, the resulting bandwidth is on the order of 40 MB/second and the response time of a random I/O request received when the contiguous I/O request is being processed is approximately 40 ms. If the I/O request is issued as 256 KB I/O request portions one at a time, then the resulting bandwidth is on the order of 30 MB/second and the response time of a random I/O request received when the contiguous I/O request is being processed is approximately 18 ms. If the pipeline mode of operation is used and the I/O request is broken into I/O request portions of 32 KB in size, then a bandwidth of 55 MB/second can be achieved and the response time of a random I/O request received when the contiguous I/O request is being processed is approximately 9 ms. If the pipeline mode is used and the I/O request is broken into I/O request portions of 64 KB, then a bandwidth of roughly 56 MB/sec can be achieved. But if the other load on the drive increases to about 50 I/O requests, the performance falls from 56 MB/sec to on the order of 25 MB/second. This decrease in performance achievable with pipelining in the presence of other load on the drive represents a condition under which it may be desirable to terminate the pipeline mode of operation (e.g., in block 194 of FIG. 6).

With the improved performance results achievable using the pipeline mode of operation, issuing sequential reads on the drives becomes optimal and almost without cost. As a result, more aggressive prefetch algorithms can be implemented, thereby taking better advantage of locality of reference.

Having described the preferred embodiments of the invention, it will now become apparent to one of ordinary skill in the art that other embodiments incorporating their concepts may be used.

It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A method, executed in connection with a disk drive having a command queue, for processing a contiguous I/O request directed to contiguous disk sectors of the disk drive and having at least a predetermined size comprising:
   issuing to the command queue of the disk drive a plurality of contiguous I/O request portions, each comprising a portion of the contiguous I/O request, so that a next one of the I/O request portions is in the command queue before the disk drive completes a current one of the I/O request portions.

2. A method, executed in connection with a data storage device having a command queue, for processing a contiguous I/O request having at least a predetermined size comprising:
   issuing to the command queue of the data storage device a plurality of contiguous I/O request portions, each comprising a portion of the contiguous I/O request, so that a next one of the I/O request portions is in the command queue before the data storage device completes a current one of the I/O request portions; and
   wherein the data storage device implements I/O request reordering based on data location, the command queue includes a low priority command queue and a high priority command queue and the I/O request portions are issued to only the low priority command queue.

3. The method of claim 1 wherein the size of the I/O request portions is adjustable.

4. A method, executed in connection with a data storage device having a command queue, for processing a contiguous I/O request having at least a predetermined size comprising:
   issuing to the command queue of the data storage device a plurality of contiguous I/O request portions, each comprising a portion of the contiguous I/O request, so that a next one of the I/O request portions is in the command queue before the data storage device completes a current one of the I/O request portions; and
   wherein the size of the I/O request portions is adjustable in response to at least one of: the bandwidth of the data storage device, the load on the data storage device, or the load on a controller executing the I/O request portions.

5. A method, executed in connection with a data storage device having a command queue, for processing a contiguous I/O request having at least a predetermined size comprising:
   issuing to the command queue of the data storage device a plurality of contiguous I/O request portions, each comprising a portion of the contiguous I/O request, so that a next one of the I/O request portions is in the command queue before the data storage device completes a current one of the I/O request portions; and
   monitoring the bandwidth of the data storage device in order to adjust the size of the I/O request portions and to determine whether the bandwidth of the data storage device would be increased by issuing the I/O request portions one at a time.

6. The method of claim 5 wherein monitoring comprises:
   issuing to the command queue a predetermined number of the I/O request portions;
   maintaining a fixed command queue length; and
   determining whether a predetermined bandwidth is achieved.

7. The method of claim 6 wherein, in response to the predetermined bandwidth not being achieved, increasing the size of a next one of the I/O request portions.

8. The method of claim 6 wherein, in response to the predetermined bandwidth being exceeded, decreasing the size of a next one of the I/O request portions.

9. A data storage system comprising:
   a disk drive comprising a disk storage medium and
   a command queue adapted to contain high priority I/O requests for the disk storage medium; and
   a processor adapted to issue I/O requests to the command queue and operable to initiate a pipeline mode operation for processing a contiguous I/O request directed to contiguous disk sectors of the disk drive and having at least a predetermined size by issuing to the command queue a plurality of contiguous I/O request portions, each comprising a portion of the I/O request, so that a next one of the I/O request portions is in the command queue before the disk drive completes a current one of the I/O request portions.

10. A data storage system comprising:
   a data storage device comprising a storage medium and
   a command queue adapted to contain high priority I/O requests for the storage medium;
   a processor adapted to issue I/O requests to the command queue and operable to initiate a pipeline mode operation for processing a contiguous I/O request of at least a predetermined size by issuing to the command queue a plurality of contiguous I/O request portions, each comprising a portion of the I/O request, so that a next one of the I/O request portions is in the command queue before the data storage device completes a current one of the I/O request portions; and
   wherein the data storage device implements I/O request reordering based on data location, the command queue includes a low priority command queue and a high priority command queue and the I/O request portions are issued to only the low priority command queue.

11. The data storage system of claim 9 wherein the processor is associated with one of: a host computer or a data storage system controller.

12. The data storage system of claim 9 wherein the processor is further operable to adjust the size of the I/O request portions.

13. A data storage system comprising:
   a data storage device comprising a storage medium and
   a command queue adapted to contain high priority I/O requests for the storage medium;
   a processor adapted to issue I/O requests to the command queue and operable to initiate a pipeline mode operation for processing a continuous I/O request of at least a predetermined size by issuing to the command queue a plurality of contiguous I/O request portions, each comprising a portion of the I/O request, so that a next one of the I/O request portions is in the command queue before the data storage device completes a current one of the I/O request portions; and
   wherein the processor is operable to adjust the size of the I/O request portions and to initiate the pipeline mode of operation in response to at least one of: the bandwidth of the data storage device, the load on the data storage device, or the load on a controller executing the I/O request portions.

14. An article comprising:
   a storage medium having stored thereon instructions that when executed by a machine result in the following:
   issuing to a command queue of a disk drive a plurality of contiguous I/O request portions, each comprising a portion of a contiguous I/O request directed to contiguous disk sectors of the disk drive and having at least a predetermined size, so that a next one of the I/O request portions is in the command queue before the disk drive completes a current one of the I/O request portions.

15. A method, executed in connection with a data storage device having a command queue, for processing a contiguous I/O request having at least a predetermined size comprising:
   issuing to the command queue of the data storage device a predetermined number of contiguous I/O request portions, each comprising a portion of the I/O request;
   determining whether the data storage device is achieving a predetermined bandwidth; and
   in response to the determination, adjusting at least one of: the size of a next I/O request portion to be issued or the state of a pipeline mode of operation in which a next one of the I/O request portions is in the command queue before the data storage device completed a current one of the I/O request portions.

16. The method of claim 15 wherein, if the data storage device implements I/O request reordering based on data location, the command queue includes a low priority command queue and a high priority command queue and issuing includes issuing the predetermined number of contiguous I/O request portions to only the low priority command queue.

17. The method of claim 15 wherein adjusting comprises:
   increasing the size of the next I/O request portion in response to a determination that the predetermined bandwidth is not achieved; and
   decreasing the size of the next I/O request portion in response to a determination that the predetermined bandwidth is exceeded.

18. The method of claim 15 wherein adjusting comprises terminating the pipeline mode of operation in response to a determination that the predetermined bandwidth cannot be achieved with the pipeline mode of operation.

19. The method of claim 15 wherein adjusting comprises initiating the pipeline mode of operation in response to a determination that the predetermined bandwidth can be achieved with the pipeline mode of operation.

* * * * *